(12) United States Patent
Torres et al.

(10) Patent No.: US 10,023,132 B1
(45) Date of Patent: Jul. 17, 2018

(54) STAKE JOINT FASTENING SYSTEM

(71) Applicant: GM GLOBAL TECHNOLOGY OPERATIONS LLC, Detroit, MI (US)

(72) Inventors: Alejandro Barrera Torres, Metepec (MX); Jesus Edgar Dominguez Cuevas, Jiutepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 15/404,415

(22) Filed: Jan. 12, 2017

(51) Int. Cl.
  *B62D 24/00* (2006.01)
  *B60R 13/02* (2006.01)
  *B60J 5/04* (2006.01)

(52) U.S. Cl.
  CPC ......... *B60R 13/0206* (2013.01); *B60J 5/0469* (2013.01)

(58) Field of Classification Search
  CPC ........................... B60R 13/0206; B60J 5/0469
  See application file for complete search history.

(56) References Cited

U.S. PATENT DOCUMENTS

| | | | |
|---|---|---|---|
| 2011/0042987 A1* | 2/2011 | Parkinson | B29C 65/08 296/1.08 |
| 2016/0176363 A1* | 6/2016 | Bachelder | B60R 13/0206 24/292 |
| 2016/0368433 A1* | 12/2016 | Vega Velazquez | B60R 13/0206 |

* cited by examiner

*Primary Examiner* — Lori L Lyjak

(57) ABSTRACT

A vehicle door trim panel fastening system is presented herein. The system includes a stake joint and mating part. The stake joint extends from at least a portion of a base panel and has a plurality of spacers. The mating part is joined to at least a portion of a door trim panel and has a plurality of protruding lock ribs. Moreover, the mating part is configured to operatively connect to the stake joint such that the mating part is interposed between the proximal end of each of the plurality of spacers and a mushroom head. The mushroom head is also configured to form around the plurality of lock ribs so as to avoid relative movement of the operatively connected mating part.

17 Claims, 4 Drawing Sheets

STAKE JOINT FASTENING SYSTEM

INTRODUCTION

For vehicle door trim panel and other interior assemblies, component panels may be installed through the implementation of stake joints that protrude from an installed base panel. However, mating trim panels in this manner allows for rattling of the door trim due to relative movement at the stake joints, which can be an inconvenience during vehicle operation. It is therefore desirable to reduce this trim rattling. The stake joint fastening system presented herein accomplishes such an effort.

In addition, a reduction to door trim rattling has been desired for a quite some time. Previous modifications to the door trim assembly process and panel structure have assisted in rattling reduction. Nevertheless, these modifications have only resulted in a partial reduction to the amount of rattling which remains above the desired threshold. Thus, the stake join system presented herein further assists in achieving a rattling level within the desired threshold.

SUMMARY

A vehicle door trim panel fastening system is presented herein. The system includes a stake joint and mating part. The stake joint extends from at least a portion of a base panel and has a plurality of spacers. The mating part is joined to at least a portion of a door trim panel and has a plurality of protruding lock ribs. Moreover, the mating part is configured to operatively connect to the stake joint such that the mating part is interposed between the proximal end of each of the plurality of spacers and a mushroom head. The mushroom head is also configured to form around the plurality of lock ribs so as to avoid relative movement of the operatively connected mating part.

The system may include a plurality of additional lock ribs so as to further avoid relative movement of the operatively connected mating part. A fastener may be installed into a central cavity of the stake joint. The additional lock ribs may moreover further avoid relative movement of the operatively connected mating part while the fastener is being installed into the central cavity. The stake joint and mating part may be constructed from a plastic material. Each of spacers may project radially from the central axis of the stake joint. The lock ribs may be molded into the mating part. The stake joint may be molded into the base panel.

A method of fastening a door trim to a vehicle door is also presented herein. The method includes the steps of (in no particular order)—(1) providing a stake joint extending from at least a portion of a base panel, the base panel configured to connect to a vehicle door, the stake joint comprising a plurality of spacers; (2) providing a mating part joined to at least a portion of the door trim, the mating part comprising a plurality of lock ribs extending from the mating part; (3) connecting the mating part to the stake joint such that the mating part abuts the proximal end of each of the plurality of spacers; (4) allowing a mushroom head to form around the plurality of lock ribs; and (5) avoiding relative movement of the connected mating part through the mushroom head being formed around the plurality of lock ribs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
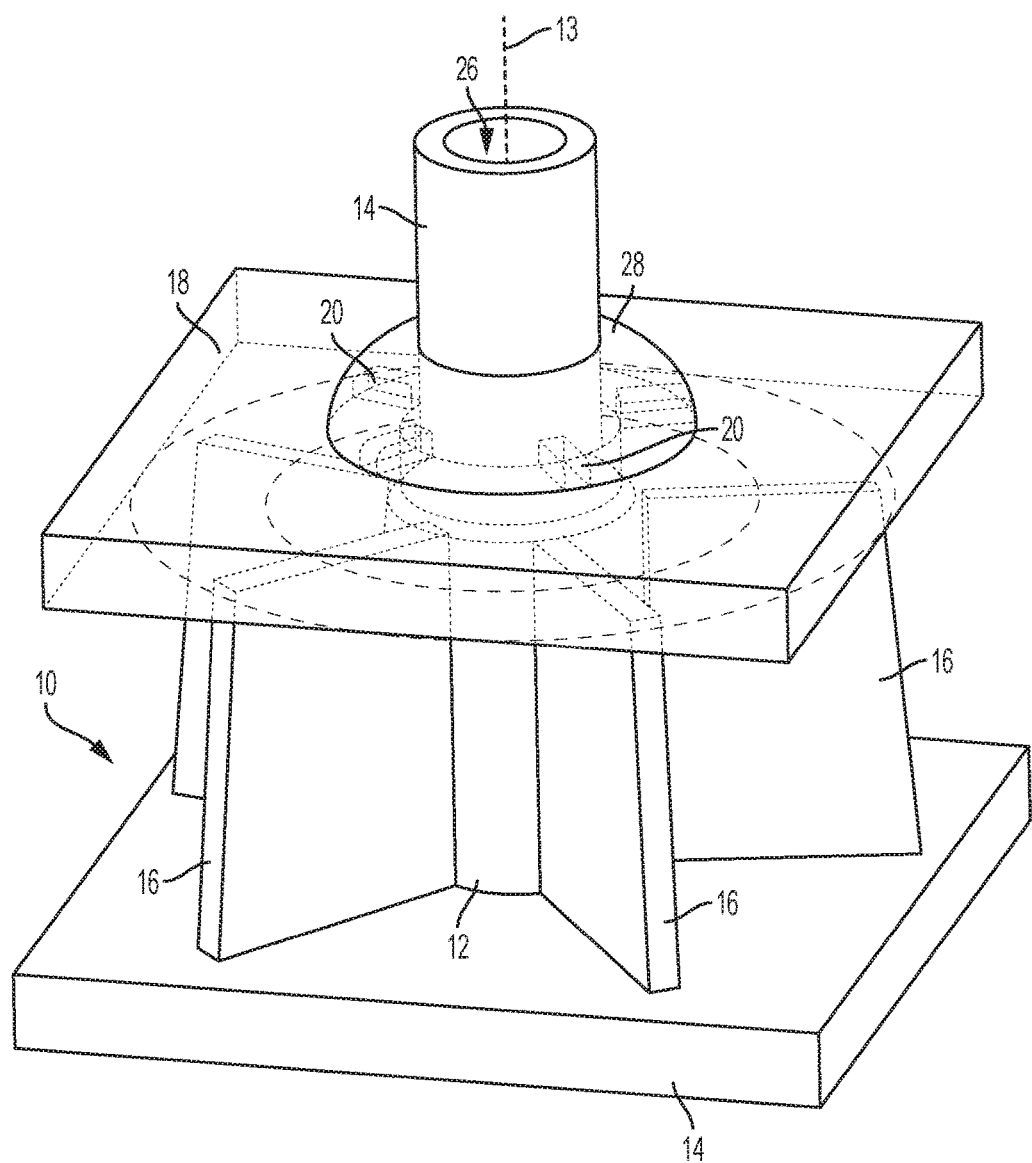
FIG. 1 shows a perspective view of an exemplary embodiment of a vehicle door trim panel fastening system.
Figure 2:
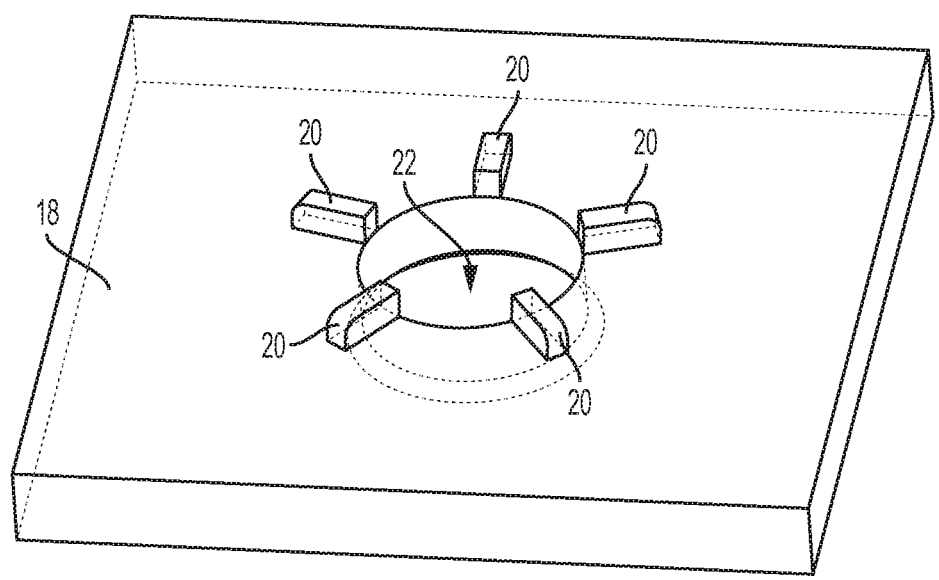
FIG. 2 shows a perspective view of one side of an exemplary mating part of the system of FIG. 1.
Figure 3:
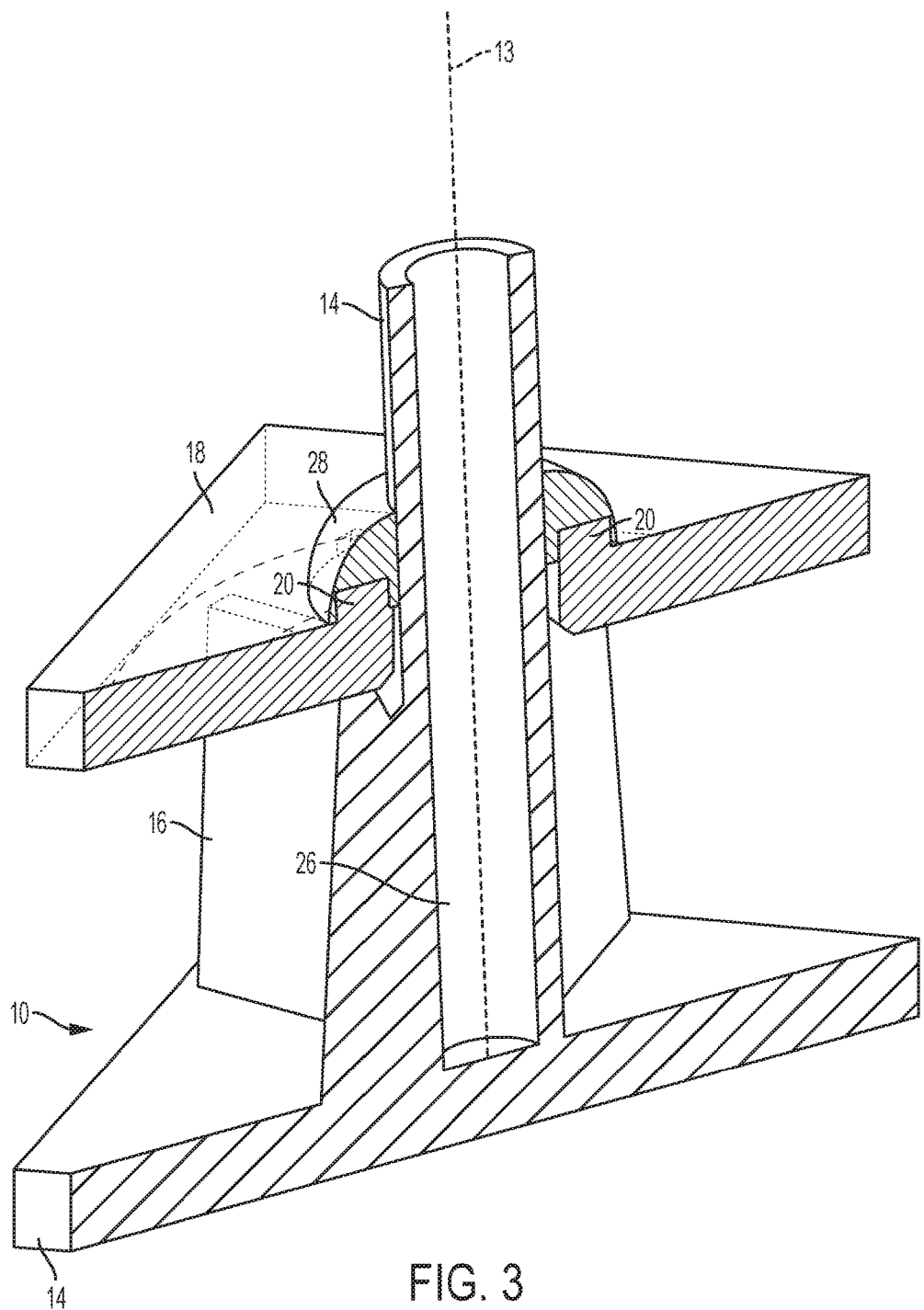
FIG. 3 shows a cutaway perspective view of the system of FIG. 1.

An embodiment of a vehicle door trim panel fastening system 10 is shown in FIGS. 1 through 3. The system 10 includes a plastic stake joint 12 (screw boss) which extends from a section of base panel 14. Multiple spacers 16 (screw boss support ribs) are molded to the stake joint 12 and project radially from an axis 13 centrally located through stake joint 12.

System 10 moreover includes a plastic mating part 18 that may be molded to at least a portion of a door trim not shown herein. The mating part 18 includes a plurality of molded lock ribs 20 which protrude from an area around a centrally located orifice 22 and in a radial direction. As can be understood, to connect the mating part 18, the proximal end of stake joint 12 inserts into central orifice 22 in a slidable manner.

When mating part 18 has been properly connected, a hollow plastic stud or pin may be melted next to the upper stake joint 12 extension to form a mushroom head 28—through one or more generally known processes. As a result, mating part 18 becomes situated between the proximal end of each spacer 16 and the mushroom head 28. When force is applied to the connected mating part 18, movement relative to axis 13 (and around stake joint 12) is avoided because each lock rib 20 has become substantially engulfed by the body of the formed mushroom head 28. As such, mating part 18 should remain static because the mushroom head 28 eliminates the degrees of freedom of the relative mating part 18 movement; and from a broad perspective, rattling of the door trim is sufficiently reduced.

Figure 4A:
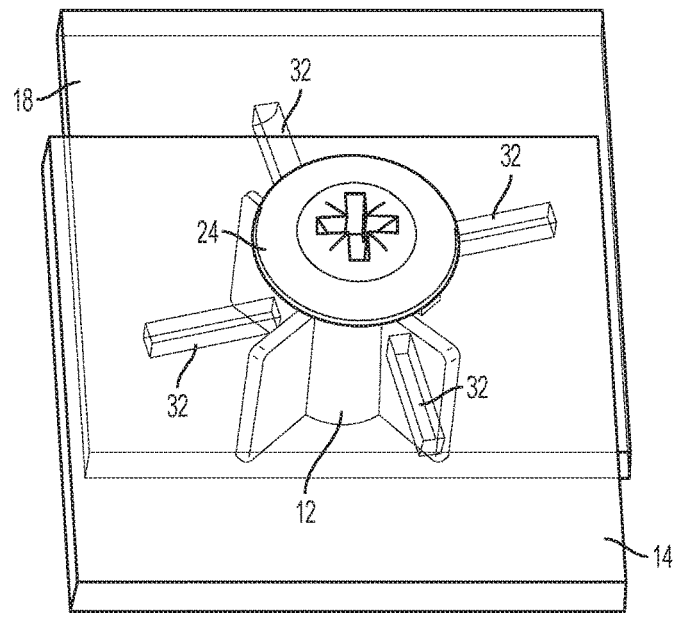
FIG. 4A shows a perspective view of another exemplary embodiment of the vehicle door trim panel fastening system.
Figure 4B:
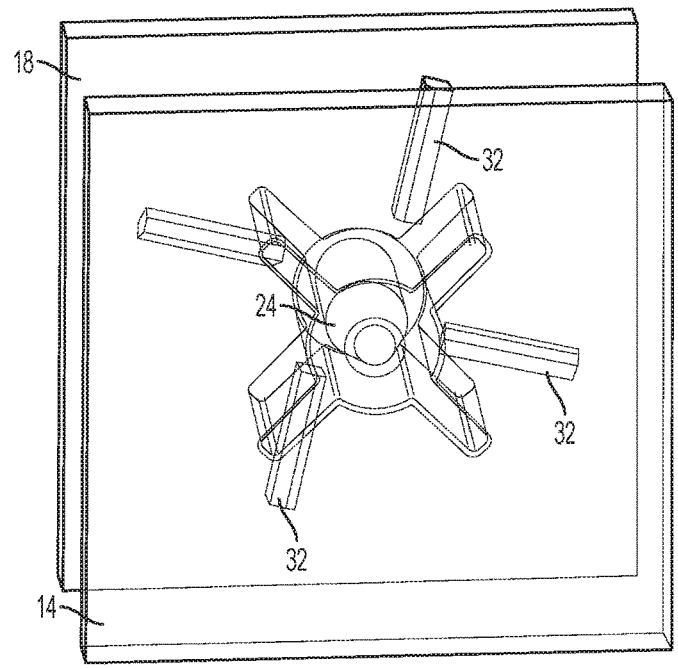
FIG. 4B shows another perspective view of the vehicle door trim panel fastening system of FIG. 4B.

Another embodiment of the vehicle door trim panel fastening system 10 is shown in FIGS. 4A and 4B. This embodiment incorporates the previously discussed features; however, mating part 18 further includes a second set of ribs 32. These additional molded lock ribs 32 are located on the opposite side of mating part 18 as the first set of lock ribs 20.

Each lock rib 32 of this additional set is moreover positioned further away from central orifice 22 than the other set and at a radial angle which aligns with their respective, corresponding spacer 16. As such, when a fastener 24 (screw) is installed into a central cavity 26 of stake joint 12 (sometimes known as the hollow boss, hollow stud, or screw boss), relative rotation of mating part 18 is further avoided by one side of each additional lock 32 making contact with one side of its respective, corresponding spacer 16.

To fasten the door trim to the vehicle door, a vehicle door assembler is require to first connect the mating part to the stake joint such that the mating part abuts the proximal ends of spacers. The assembler is then required to melt a hollow plastic stud or pin onto a section of stake joint 12 to form a mushroom head. As discussed above, mating part should be interposed between the spacers and mushroom head. Relative movement of the connected mating part should thus be avoided due to the mushroom head being formed around the protruding lock ribs. The assembler may also install a fastener into the central cavity of the stake joint. As second lock rib set would further ensure relative movement of the mating part is avoided.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle door trim panel fastening system comprising:
   a stake joint extending from at least a portion of a base panel, the stake joint comprising a plurality of spacers;
   a mating part joined to at least a portion of a door trim, the mating part comprising a plurality of protruding lock ribs;
   wherein the mating part is configured to operatively connect to the stake joint such that the mating part is interposed between the proximal end of each of the plurality of spacers and a mushroom head; and
   wherein the mushroom head is configured to form around the plurality of lock ribs so as to avoid relative movement of the operatively connected mating part.

2. The system of claim 1, further comprising a plurality of additional lock ribs so as to further avoid relative movement of the operatively connected mating part.

3. The system of claim 2, further comprising a fastener installed into a central cavity of stake joint, wherein the additional lock ribs further avoid relative movement of the operatively connected mating part while the fastener is being installed into the central cavity.

4. The system of claim 1, wherein the stake joint and mating part are constructed from a plastic material.

5. The system of claim 1, wherein each of spacers project radially from the central axis of the stake joint.

6. The system of claim 1, wherein the lock ribs are molded into the mating part.

7. The system of claim 1, wherein the stake joint is molded into the base panel.

8. A method of fastening a door trim to a vehicle door, the method comprising:
   providing a stake joint extending from at least a portion of a base panel, the stake joint comprising a plurality of spacers;
   providing a mating part joined to at least a portion of the door trim, the mating part comprising a plurality of protruding lock ribs;
   connecting the mating part to the stake joint such that the mating part abuts the proximal end of each of the plurality of spacers;
   allowing a mushroom head to form around the plurality of lock ribs, the mating part being interposed between the proximal end of each of the plurality of spacers and the formed mushroom head; and
   avoiding relative movement of the connected mating part through the mushroom head being formed around the plurality of lock ribs.

9. The method of claim 8, wherein the mating part further comprising a plurality of additional lock ribs; and
   avoiding relative movement of the connected mating part through contact made between the additional lock ribs and the spacers while a fastener is being installed into the stake joint.

10. The method of claim 9, wherein a side of each additional lock rib makes contact with a side of each spacer to avoid relative movement of the mating part around the central axis of the stake joint.

11. The method of claim 8, wherein the stake joint and mating part are constructed from a plastic material.

12. The method of claim 8, wherein each of spacers project radially from the central axis of the stake joint.

13. The method of claim 8, wherein the lock ribs are molded into the mating part.

14. The method of claim 8, wherein the stake joint is molded into the base panel.

15. A vehicle door trim panel fastening system comprising:
   a plastic stake joint extending from at least a portion of a base panel, the stake joint comprising a plurality of molded spacers that project radially from the central axis of the stake joint;
   a plastic mating part molded to at least a portion of a door trim, the mating part comprising a plurality of molded protruding lock ribs;
   wherein the mating part is configured to operatively connect to the stake joint such that the mating part is interposed between the proximal end of each of the plurality of spacers and a mushroom head; and
   wherein the mushroom head is configured to form around the plurality of lock ribs so as to avoid relative movement of the operatively connected mating part.

16. The system of claim 15, further comprising a plurality of additional lock ribs so as to further avoid relative movement of the operatively connected mating part.

17. The system of claim 16, further comprising a fastener installed into a central cavity of stake joint, wherein the additional lock ribs further avoid relative movement of the operatively connected mating part through contact made with the spacers while the fastener is being installed into the central cavity.

\* \* \* \* \*